(12) United States Patent
Nakagawa et al.

(10) Patent No.: US 8,284,308 B2
(45) Date of Patent: Oct. 9, 2012

(54) VIDEO SIGNAL PROCESSING DEVICE AND VIDEO SIGNAL PROCESSING METHOD

(75) Inventors: Akira Nakagawa, Kawasaki (JP); Shunsuke Kobayashi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 707 days.

(21) Appl. No.: 12/399,286

(22) Filed: Mar. 6, 2009

(65) Prior Publication Data
US 2009/0225225 A1 Sep. 10, 2009

(30) Foreign Application Priority Data

Mar. 7, 2008 (JP) ................................. 2008-057727
Jul. 15, 2008 (JP) ................................. 2008-184005

(51) Int. Cl.
H04N 11/20 (2006.01)
H04N 7/01 (2006.01)
(52) U.S. Cl. .................... 348/453; 348/458; 348/571
(58) Field of Classification Search .................. 348/453, 348/458, 441, 443, 444, 459, 432, 437, 397, 348/398, 392, 426, E7.004, 571; H04N 7/01, H04N 11/20
See application file for complete search history.

(56) References Cited

U.S. PATENT DOCUMENTS

| | | | |
|---|---|---|---|
| 4,829,378 A | 5/1989 | LeGall | |
| 5,182,645 A | 1/1993 | Breeuwer et al. | |
| 5,500,679 A | 3/1996 | Higurashi et al. | |
| 5,943,642 A | 8/1999 | Choi | |
| 7,043,512 B2 * | 5/2006 | Lee et al. | 708/300 |
| 7,418,142 B2 * | 8/2008 | Zandi et al. | 382/232 |

FOREIGN PATENT DOCUMENTS

| | | |
|---|---|---|
| EP | 0 465 732 A1 | 1/1992 |
| EP | 0692915 | 1/1996 |
| GB | 2 344 241 A | 5/2000 |
| JP | 6-343162 | 12/1994 |
| JP | 7-107445 | 4/1995 |
| JP | 8-33002 | 2/1996 |
| JP | 2005-303887 | 10/2005 |

OTHER PUBLICATIONS

Vivien Chappelier et al., "Oriented Wavelet Transform for Image Compression and Denoising", IEEE Transactions on Image Processing, vol. 15, No. 10, pp. 2892-2903, Oct. 31, 2006.
Korean Office Action dated Feb. 22, 2009 and issued in corresponding Korean Patent Application 10-2009-0019496.
Chinese Office Action issued Apr. 2, 2010 in corresponding Chinese Patent Application 200910004516.2.
Y. Ohtsuka et al., "Consideration of CTV/HDTV Compatible Coding", The Institute of Electronics, Information and Communication Engineers: Spring Convention; 1992; 1 p. (translation 2 pp.).
Japanese Office Action mailed Feb. 14, 2012 issued in corresponding Japanese Patent Application No. 2008-184005.
European Office Action dated Aug. 20, 2012 issued in corresponding European Patent Application No. 09154528.5.

* cited by examiner

Primary Examiner — Trang U Tran
(74) Attorney, Agent, or Firm — Staas & Halsey LLP

(57) ABSTRACT

An decomposition filter includes a top-field low-frequency decomposition filter and a bottom-field low-frequency decomposition filter whose coefficient is obtained by vertically inverting the coefficient of the top-field low-frequency decomposition filter. It also includes a top-field high-frequency decomposition filter and a bottom-field high-frequency decomposition filter whose coefficient is obtained by vertically inverting the coefficient of the top-field high-frequency decomposition filter. The above-described filters are switched and used according to which an input signal is for, a top-field or a bottom-field.

6 Claims, 11 Drawing Sheets

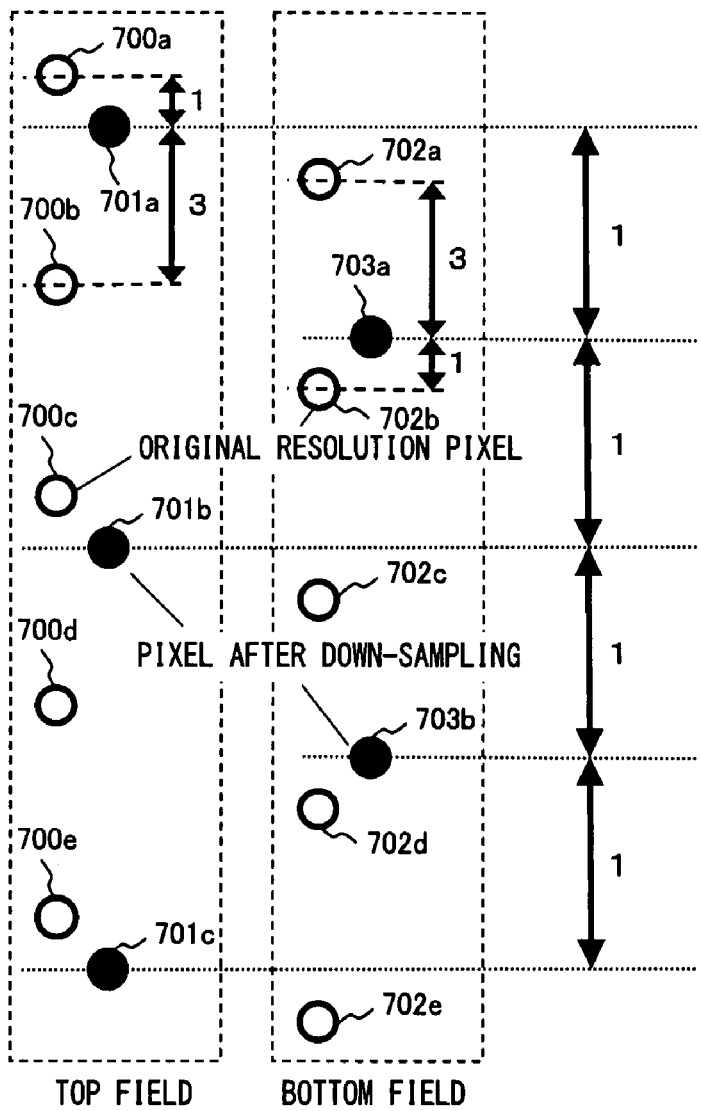
F I G. 7

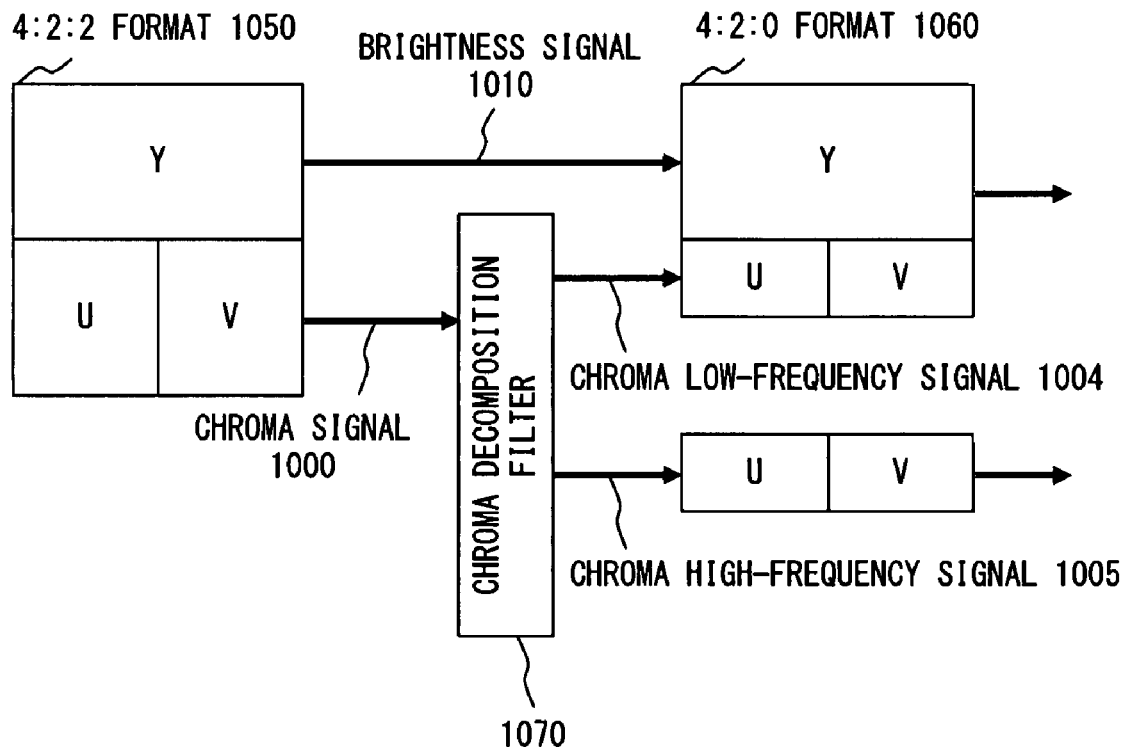
F I G. 1 0

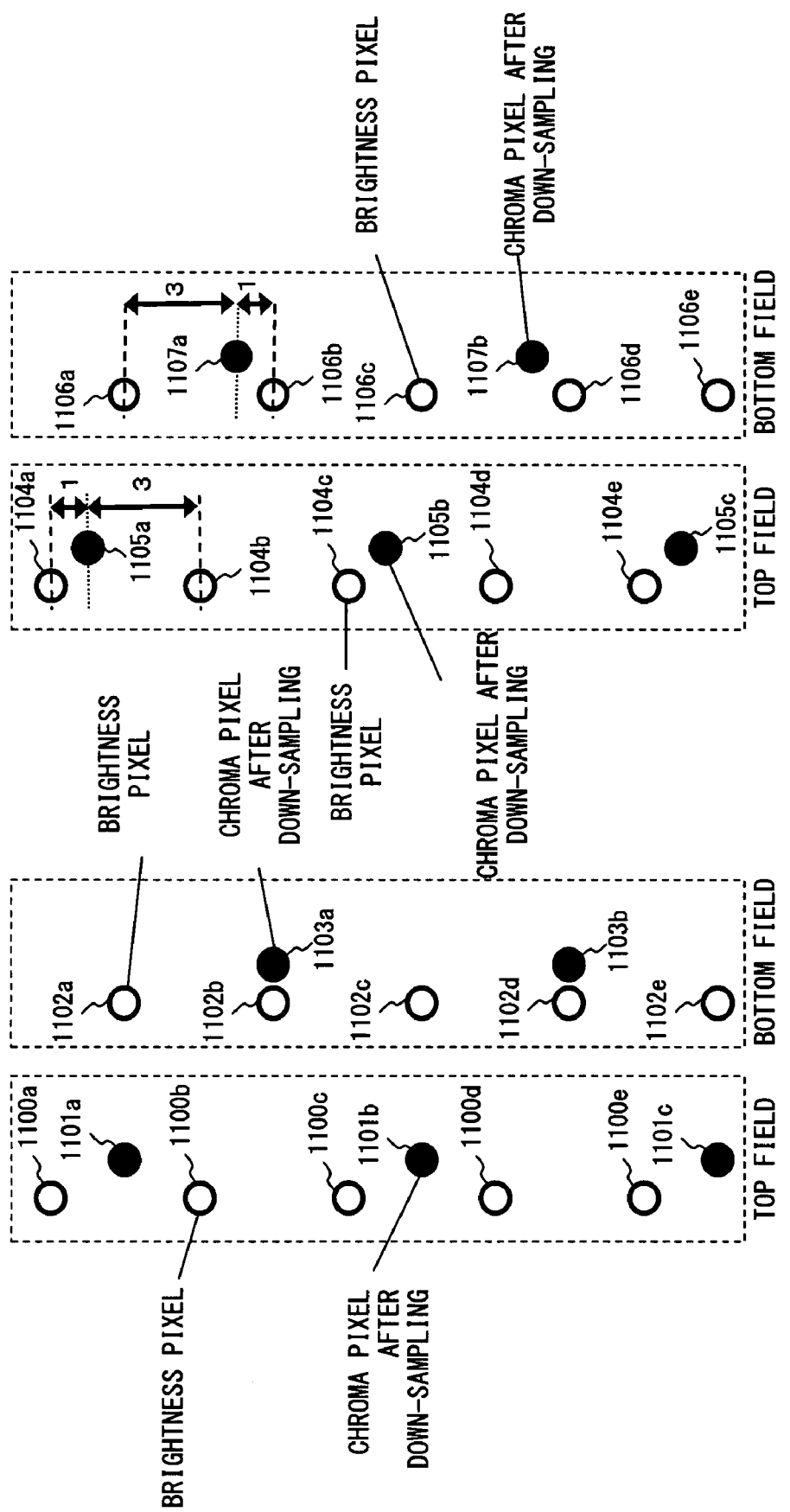

VIDEO SIGNAL PROCESSING DEVICE AND VIDEO SIGNAL PROCESSING METHOD

CROSS-REFERENCE TO RELATED APPLICATION

This application is based upon and claims the benefit of the prior Japanese Patent Application No. 2008-184005, filed on Jul. 15, 2008 and Japanese Patent Application No. 2008-057727, filed on Mar. 7, 2008, the entire contents of which are incorporated herein by reference.

FIELD

The embodiments discussed herein are related to a video signal processing device for dividing and composing the sub-band encoding band of a video signal having an interlace structure and its video signal processing method.

BACKGROUND

A sub-band signal processing for dividing a very fine video signal into two or more frequency bands and performing hierarchical encoding is widely proposed. This hierarchically encodes, for example, a high-definition (HD) image and an image corresponding to a standard definition (SD) whose resolution is sampled down in half.

FIG. 1 explains the sub-band division using Z transform. A decomposition filter 170 includes a low-frequency decomposition filter 110, a high-frequency decomposition filter 120 and down-samplers 112 and 122 for sampling resolution down in half. The low-frequency decomposition filter 110 and the high-frequency decomposition filter 120 can be expressed as A(Z) and B(Z), respectively, using Z transform.

The decomposition filter 170 divides a 2N-point input signal X(Z) 100 into an N-point low-frequency signal L(Z) 104 and an N-point high-frequency signal H(Z) 105.

The composition filter 180 includes up-samplers 113 and 123 for 1:2 sampling up, a low-frequency composition filter 130 and a high-frequency composition filter 140. The low-frequency composition filter 130 and the high-frequency composition filter 140 can be expressed as P(Z) and Q(Z), respectively, using Z transform.

1:2 up-sampling is performed by inserting 0 in the N-point low-frequency signal L(Z) 104 and the N-point high-frequency signal H(Z) 105, the output of the low-frequency composition filter 130 and output of the high-frequency composition filter 140 are added and a 2N-point composition signal Y(Z) 101 is obtained. In this case, the input signal X(Z) and the composition signal Y(Z) are completely matched except fixed delay by using a filter meeting perfect reconstruction filter bank conditions.

In order to meet the perfect reconstruction filter bank conditions, it is necessary to meet the following Equations 1 and 2.

$$P(Z) \cdot A(Z) + Q(Z) \cdot B(Z) = 2 \cdot Z^{-L} \quad \text{(Equation 1)}$$

$$P(Z) \cdot A(-Z) + Q(-Z) \cdot B(-Z) = 0 \quad \text{(Equation 2)}$$

If the coefficient of each filter is a finite tap length and is only a real number, the following condition can be led from the above-described conditions.

$$P(Z) \cdot A(Z) + P(-Z) \cdot A(-Z) = 2 \cdot Z^{-L} \quad \text{(Equation 3)}$$

$$B(Z) = C \cdot P(-Z) \quad \text{(Equation 4)}$$

$$Q(Z) = -(1/C) \cdot A(-Z) \quad \text{(Equation 5)}$$

In the above-described equations, C is an arbitrary constant and L is an appropriate number of fixed delay, respectively. A perfect reconstruction filter bank can be specified by assigning either the A(Z) or Q(Z) and either the P(Z) or B(Z) according to the Equations 4 and 5.

Conventionally, as one method to meet the above-described conditions, a sub-band filter, such as a symmetric short kernel filter (SSKF), a Daubechies 9/7 tap and the like, are known and various sub-band encoding methods are adopted by JPEG-2000 and the like. Conventionally, for a perfect reconstruction filter bank used for the band division of image encoding, one in which each of the above-described A(Z), B(Z) and Q(Z) has a linear phase is used.

In this case, there are two types of a linear phase filter as follows; the number of taps is odd or even. Firstly, if the number of taps of a filter is 2N+1 (odd) assuming that N is a natural number, a filter H(Z) with (2N+1) taps can be expressed as follows, using Z transform.

$$H(Z) = \Sigma h(k) \cdot Z^{-k}$$

The coefficient h(k) of the above-described equation has the following nature.

$$h(k) = h(2N-k) \quad (k=0 \sim N-1) \quad \text{(Equation 6)}$$

FIG. 2 illustrates the pixel position before/after the filtering process of the odd tap filter and the even tap filter.

As illustrated in FIG. 2A, the pixel position 210 after the filtering process of the odd tap filter is disposed in the same position as the pixel position 202 before the filtering process. Specifically, in this case, group delay is 0 pixel. As an example of a perfect reconstruction filter bank meeting this condition, there are an SSKF (3, 5) tap filter, Daubechies (9, 7) tap filter which are adopted by JPEG-2000 and the like.

If the number of taps of a filter is 2N (even) assuming that N is a natural number, the coefficient h(n) of the 2N tap filter has the following nature.

$$h(k) = h(2N-1-k) \quad (k=0 \sim N-1) \quad \text{(Equation 7)}$$

As illustrated in FIG. 2B, the pixel position 220 after the filtering process of the even tap filter is a point obtained by internally dividing adjacent pixels 211 and 212 in the ratio 1:1, specifically, the intermediate point between the pixels 211 and 212. In this case, group delay is a ½ pixel. As an example of a perfect reconstruction filter bank meeting this condition, there are an SSKF (4, 4) tap filter and the like.

Patent document 1: Japanese Patent Laid-open Publication No. H7-107445

Patent document 2: Japanese Patent Laid-open Publication No. H6-343162

FIGS. 3A and 3B illustrate brightness and chroma pixels in a 4:2:2 format, and brightness and chroma pixels in a 4:2:0 format.

As illustrated in FIG. 3A, the brightness pixel 300a and chroma pixel 301a in the top field of a 4:2:2 format are disposed in the same position and the brightness pixel 302a and chroma pixel 303a in the bottom field are also disposed in the same position.

As illustrated in FIG. 3B, the chroma pixel 305a in the top field of a 4:2:0 format is disposed in a position obtained by internally dividing the brightness pixels 304a and 304b in the ratio 1:3 downward in the vertical direction. The chroma pixel 307a in the bottom field is disposed in a position obtained by internally dividing the brightness pixels 306a and 306b in the ratio 3:1 downward.

However, when dividing the top and bottom fields into a low-frequency signal L(Z) and a high-frequency signal H(Z) in the ratio 2:1 using the same filter bank in order to sub band-divide the vertical component of an interlace image, the interlace scanning line position structure of the low-frequency signal becomes incomplete.

That is, distance of the bottom field pixels from the top field pixels, or, distance of the top field pixels from the bottom field pixels is not equal. Its details are described in D-334 "Problems and Countermeasures of Current TV/HDTV Compatible Encoding" of the proceedings of 1992 IEICE Spring Conference.

As its countermeasures, conventionally, several solutions are proposed. In Patent document 1, it is described that the position deviation of a pixel after the sub-band division can be eliminated by dividing the band into three sub-bands.

In Patent document 2, by applying sub-band division into a low-frequency signal and a high-frequency signal by a perfect reconstruction filter bank whose number of taps is even to a pixel in the top field and applying sub-band division into a low-frequency signal and a high-frequency signal by a perfect reconstruction filter bank whose number of taps is odd to a pixel in the bottom field, the scanning line position structure of a top field and a bottom field can be maintained. Thus, the distance of the bottom field pixels from the top field pixels and the distance of the top field pixels from the bottom field pixels equal.

Next, pixel positions at the time of down-sampling in the case where sub-band division is performed using an odd tap filter and an even tap filter are explained with reference to FIGS. 4A and 4B.

If even tap filtering explained in FIG. 2B is applied to the top field, as to brightness pixels, brightness pixels 402a and 402b after down-sampling are generated at points obtained by internally dividing each of the brightness pixels 400a and 400b of the original resolution in the ratio 1:1, and brightness pixels 400c and 400d in the ratio 1:1. Similarly, as to chroma pixels, a chroma pixel 403 after down-sampling is generated at a point obtained by internally dividing the chroma pixels 401a and 401b in the ratio 1:1.

If odd tap filtering explained in FIG. 2A is applied to the bottom field, as to brightness pixels, brightness pixels 406a and 406b after down-sampling are generated in the same positions as the brightness pixels 404b and 404d of the original resolution. Similarly, as to chroma pixels, a chroma pixel 407 after down-sampling is generated in the same position as the chroma pixel 405b of the original resolution.

However, the method described in Patent document 2 cannot meet the disposition conditions of brightness and chroma pixels in the vertical direction of a 4:2:0 interlace format as illustrated in FIG. 3B, which are specified by video encoding standards, such as the H.264/MPEG-4 Part 10 of International Telecommunications Union Telecommunications Standardization Sector (ITU-T) and the like.

Specifically, if sub-band division is applied to an image in the top field of the 4:2:0 format, using an even tap filter, as illustrated in FIG. 4A, the chroma pixel 403 after down-sampling is generated in a position obtained by internally dividing the brightness pixels 402a and 402b after down-sampling into 3:5 downward. This does not coincide with the position obtained by internally dividing brightness pixels in the ratio 1:2 being the home position of a chroma pixel in the top field of the 4:2:0 format illustrated in FIG. 3B.

If sub-band division is applied to in image in the bottom field using an odd tap filter, as illustrated in FIG. 4B, the chroma pixel 407 after down-sampling is generated in a position obtained by internally dividing the brightness pixels 406a and 406b after down-sampling them in the ratio 7:1 downward. This does not coincide with the position obtained by internally dividing brightness pixels in the ratio 3:1 being the home position of a chroma pixel in the bottom field of the 4:2:0 format illustrated in FIG. 3B.

Furthermore, since in the above-described method it is necessary to use different filters between the top and bottom fields, the frequency characteristics of the amplitude of the top and bottom field after filtering process cannot be completely matched.

SUMMARY

According to an aspect of the invention, a disclosed video signal processing device divides a video signal having an interlace structure composed of the first and second fields into a low-frequency area and a high-frequency area at least in the vertical direction. The video signal processing device includes a first low-frequency signal generation unit for applying filtering with a first low-frequency decomposition filter to a pixel in the first field of the video signal in the vertical direction and generating a first low-frequency signal sampled down to 2:1, a first high-frequency signal generation unit for applying filtering with a first high-frequency decomposition filter to a pixel in the first field of the video signal in the vertical direction and generating a first high-frequency signal sampled down to 2:1, a second low-frequency signal generation unit for applying filtering with a second low-frequency decomposition filter whose coefficient is obtained by vertically inverting that of the first low-frequency pass filter, to a pixel in the second field of the video signal in the vertical direction and generating a second low-frequency signal sampled down to 2:1 and a second high-frequency signal generation unit for applying filtering with a second high-frequency pass filter whose coefficient is obtained by vertically inverting that of the first high-frequency decomposition filter, to a pixel in the second field of the video signal in the vertical direction and generating a second high-frequency signal sampled down to 2:1. The video signal processing device further includes a low-frequency composition filter and a high-frequency composition filter which satisfy the sub-band perfect reconstruction filter bank conditions of the first low-frequency and high-frequency decomposition filters, respectively, in a prescribed error range and also the first low-frequency decomposition filter calculates a pixel value in a pixel position obtained by internally dividing each pixel in the ratio of almost 1:3.

According to another aspect of the invention, a disclosed video signal processing device composes the first low-frequency signal, the first high-frequency signal, the second low-frequency signal and the second high-frequency signal whose bands are divided at least in the vertical direction into a video signal having an interlace structure composed of the first and second fields. The video signal processing device includes a first composition unit for generating a signal obtained by sampling up the first low-frequency signal to 1:2 in the vertical direction using a first low-frequency composition filter and a signal obtained by sampling up the first high-frequency signal to 1:2 in the vertical direction using a first high-frequency composition filter and adding both the signals to generate a first field and a second composition unit for generating a signal obtained by sampling up the second low-frequency signal to 1:2 in the vertical direction using a second low-frequency composition filter whose coefficient is obtained by vertically inverting the coefficient of the first low-frequency composition filter and a signal obtained by sampling up the second high-frequency signal to 1:2 in the vertical direction using a second high-frequency composition filter whose coefficient is obtained by vertically inverting the first high-frequency composition filter and adding both the signals to generate a second field. The video signal processing device further includes a low-frequency decomposition filter and a high-frequency decomposition filter which satisfy the sub-band perfect reconstruction filter bank conditions of the first low-frequency and high-frequency composition filters in a prescribed error range and also the low-frequency decomposition filter calculates a pixel value in a position obtained by internally dividing each pixel in the ratio of almost 1:3.

According to another aspect of the invention, a disclosed video signal processing device divides a video signal having an interlace structure composed of the first and second fields into a low-frequency area and a high-frequency area at least in the vertical direction. The video signal processing device includes a first low-frequency signal generation unit for applying filtering with a first low-frequency decomposition filtering at $A(Z)$ to a pixel in the first field of the video signal in the vertical direction and generating a first low-frequency signal sampled down to 2:1, a first high-frequency signal generation unit for applying filtering with a first high-frequency decomposition filter $B(Z)$ to a pixel in the first field of the video signal in the vertical direction and generating a first high-frequency signal sampled down to 2:1, a second low-frequency signal generation unit for applying filtering with a second low-frequency decomposition filter $A(1/Z)$ whose coefficient is obtained by vertically inverting the coefficient of the first low-frequency decomposition filter $A(Z)$, to a pixel in the second field of the video signal in the vertical direction and generating a second low-frequency signal sampled down to 2:1 and a second high-frequency signal generation unit for applying filtering with a second high-frequency decomposition filter $B(1/Z)$ whose coefficient is obtained by vertically inverting the coefficient of the first high-frequency decomposition filter $B(Z)$, to a pixel in the second field of the video signal in the vertical direction and generating a second high-frequency signal sampled down to 2:1. The video signal processing device further includes a low-frequency composition filter $P(Z)$ and a high-frequency composition filter $Q(Z)$ which satisfy the sub-band perfect reconstruction filter bank conditions of the first low-frequency decomposition filter $A(Z)$ and high-frequency decomposition filter $B(Z)$ in a prescribed error range and also the first low-frequency decomposition filter $A(Z)$ calculates a pixel value in a position obtained by internally dividing each pixel in the ratio of almost 1:3.

According to another aspect of the invention, a disclosed video signal processing device composes the first low-frequency signal, the first high-frequency signal, the second low-frequency signal and the second high-frequency signal whose bands are divided at least in the vertical direction into a video signal having an interlace structure composed of the first and second fields. The video signal processing device includes a first composition unit for generating a signal obtained by sampling up the first low-frequency signal to 1:2 in the vertical direction using a first low-frequency composition filter $P(Z)$ and a signal obtained by sampling up the first high-frequency signal to 1:2 in the vertical direction using a first high-frequency composition filter $Q(Z)$ and adding both the signals to generate a first field and a second composition unit for generating a signal obtained by sampling up the second low-frequency signal to 1:2 in the vertical direction using a second low-frequency composition filter $P(1/Z)$ whose coefficient is obtained by vertically inverting the first low-frequency composition filter $P(Z)$ and a signal obtained by sampling up the second high-frequency signal to 1:2 in the vertical direction using a second high-frequency composition filter $Q(1/Z)$ whose coefficient is obtained by vertically inverting the coefficient of the first high-frequency composition filter $Q(Z)$ and adding both the signals to generate a second field. The video signal processing device further includes a low-frequency decomposition filter $A(Z)$ and a high-frequency decomposition filter $B(Z)$ which satisfy the sub-band perfect reconstruction filter bank conditions of the first low-frequency composition filter $P(Z)$ and the high-frequency composition filter $Q(Z)$ in a prescribed error range and also the low-frequency decomposition filter $A(Z)$ calculates a pixel value in a position obtained by internally dividing each pixel in the ratio of almost 1:3.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 explains the pixel positions before/after down-sampling in the sub-band conversion of the preferred embodiment;

FIG. 10 explains the case where sub-band encoding is applied to only a chroma signal; and FIGS. 11A and 11B explain sub-band conversion from a 4:2:2 format to a 4:2:0 format.

DESCRIPTION OF EMBODIMENTS

Figure 5:
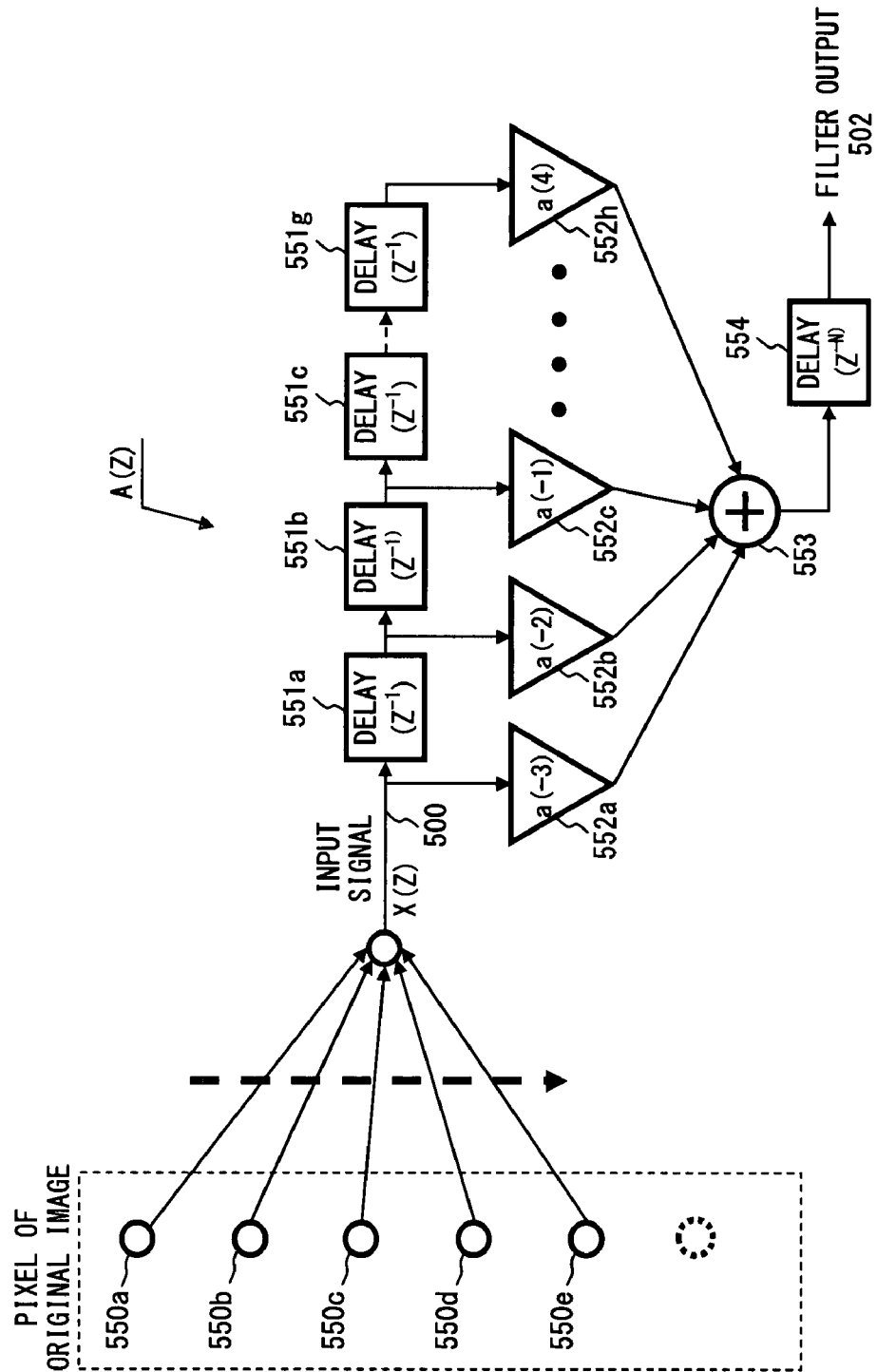
FIG. 5 is a configuration of a low-frequency decomposition filter.

Preferred embodiments of the present invention will be explained with reference to accompanying drawings. FIG. 5 is a configuration of a low-frequency decomposition filter.

The low-frequency decomposition filter $A(Z)$ illustrated in FIG. 5 includes a plurality of delayers 551*a*, 551*b*, 551*c*, . . . , 551*g*, each for giving one delay unit ($Z^{-1}$) of delay, a plurality of multipliers 552*a*, 552*b*, 552*c*, . . . , 552*h*, an adder 553 for adding the output of the multipliers 552*a* through 552*h* and a delayer 554 for delaying the output of the adder 553 by prescribed delay units ($Z^{-N}$). The delayer 554 is used to adjust the output timing of a pixel and is appropriately provided, as requested.

The pixels 550*a* through 550*e* of the original image given as an input signal 500 are sequentially inputted to the low-frequency decomposition filter $A(Z)$, each of them is delayed by one delay unit by each of the delayers 551*a* through 551*g* and the input signal 500 and the output signal of each of the delayers 551*a* through 551*g* are outputted to each of corresponding multipliers 552*a* through 552*h*.

This low-frequency decomposition filter $A(Z)$ is, for example, a low-frequency pass filter with eight taps. The multipliers 552a through 552h multiply eight filter coefficients a(−3), a(−2), a(−1), . . . , a(4).

Figure 6:
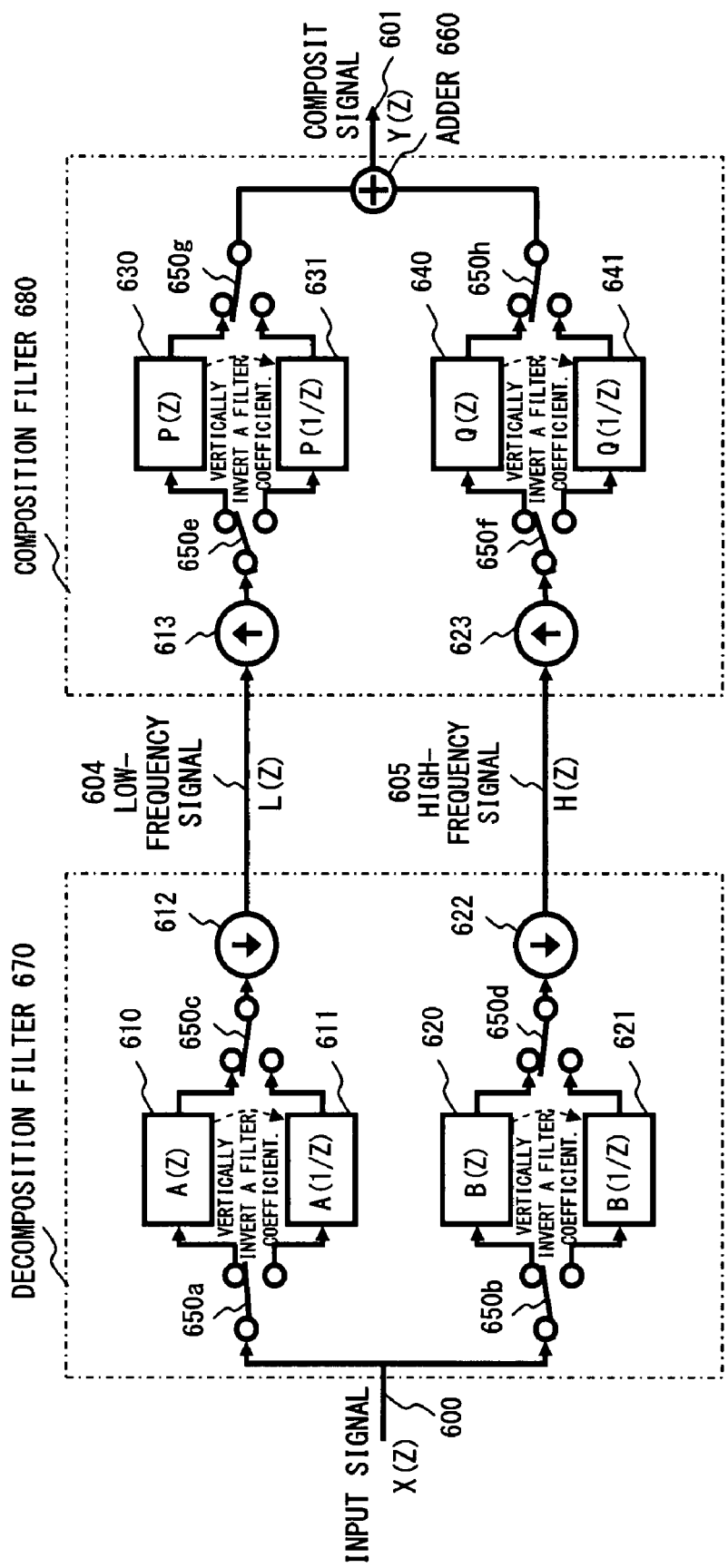
FIG. 6 is configurations of the decomposition filter and composition filter in the preferred embodiment.

Next, FIG. 6 is the configurations of the decomposition filter 670 and composition filter 680 of a video signal processing device in the first preferred embodiment.

The video signal processing device is, for example, an encoding device for sub band-encoding an interlace video signal, a decoding device for decoding a sub band-encoded signal or a device having both the functions.

The decomposition filter 670 includes filter selection units 650a, 650b, 650c and 650d, a top-field low-frequency decomposition filter 610, a bottom-field low-frequency decomposition filter 611, a top-field high-frequency decomposition filter 620, a bottom-field high-frequency decomposition filter 621 and down-samplers 612 and 622.

The top-field low-frequency decomposition filter 610 and the bottom-field low-frequency decomposition filter 611 can be expressed as A(Z) and A(1/Z), respectively, using Z transform. The top-field high-frequency decomposition filter 620 and the bottom-field high-frequency decomposition filter 621 can be expressed as B(Z) and B(1/Z), respectively, using Z transform.

The composition filter 680 includes up-samplers 613 and 623, filter selection units 650e, 650f, 650g and 650h, a top-field low-frequency composition filter 630, a bottom-field low-frequency composition filter 631, a top-field high-frequency composition filter 640, a bottom-field high-frequency composition filter 641 and an adder 660.

The top-field low-frequency composition filter 630 and the bottom-field low-frequency composition filter 631 can be expressed as P(Z) and P(1/Z), respectively, using Z transform. The top-field high-frequency composition filter 640 and the bottom-field high-frequency composition filter 641 can be expressed as Q(Z) and Q(1/Z), respectively, using Z transform.

In this preferred embodiment, the decomposition filter 670 and composition filter 680 simultaneously meet both the following conditions 1 and 2.

The low-frequency decomposition filters (A(Z) and A(1/Z) in FIG. 6), the high-frequency decomposition filters (B(Z) and B(1/Z) in FIG. 6), the low-frequency composition filters (P(Z) and P(1/Z) in FIG. 6) and the high-frequency composition filters (Q(Z) and Q(1/Z) in FIG. 6) meet perfect reconstruction filter bank conditions (Condition 1).

The low-frequency decomposition filter calculates the pixel value in a position obtained by internally dividing each pixel in the ratio of almost 1:3 (Condition 2).

Figure 1:
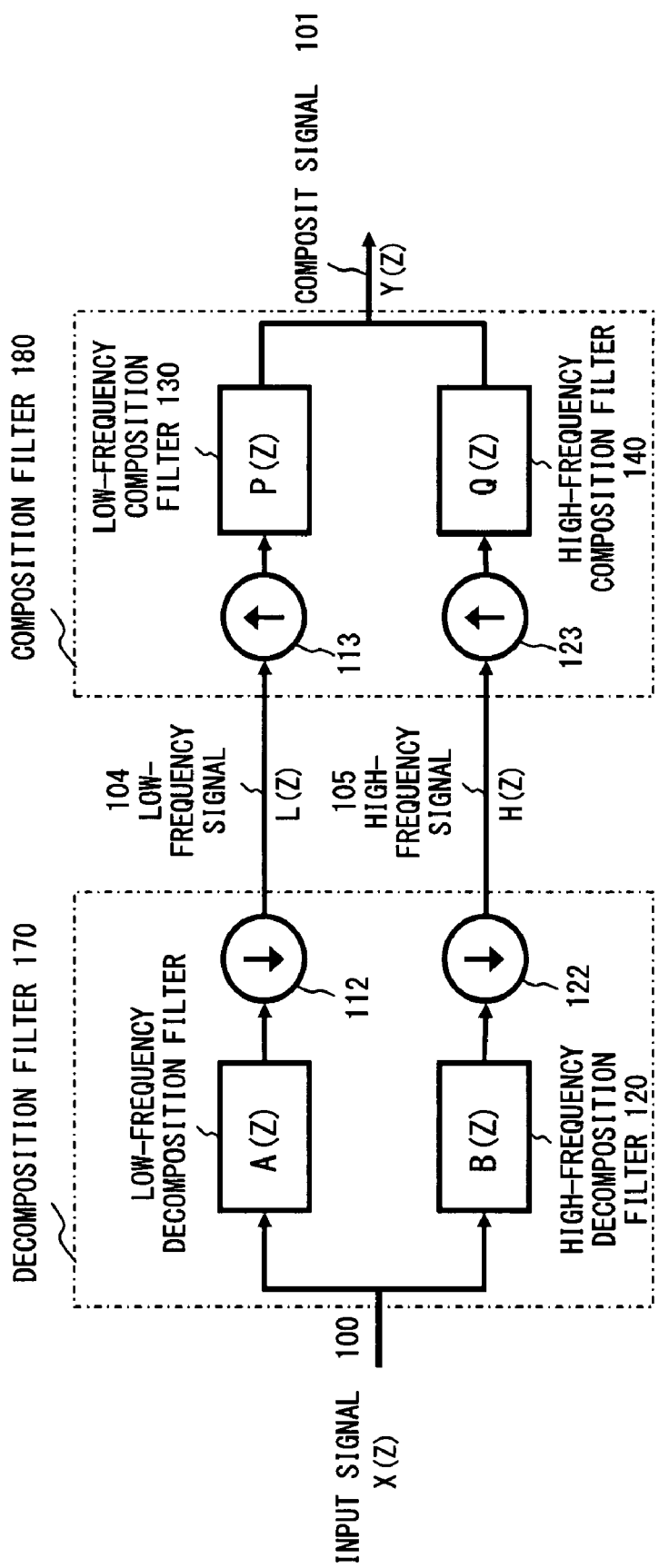
FIG. 1 explains the sub-band division.
Figure 2:
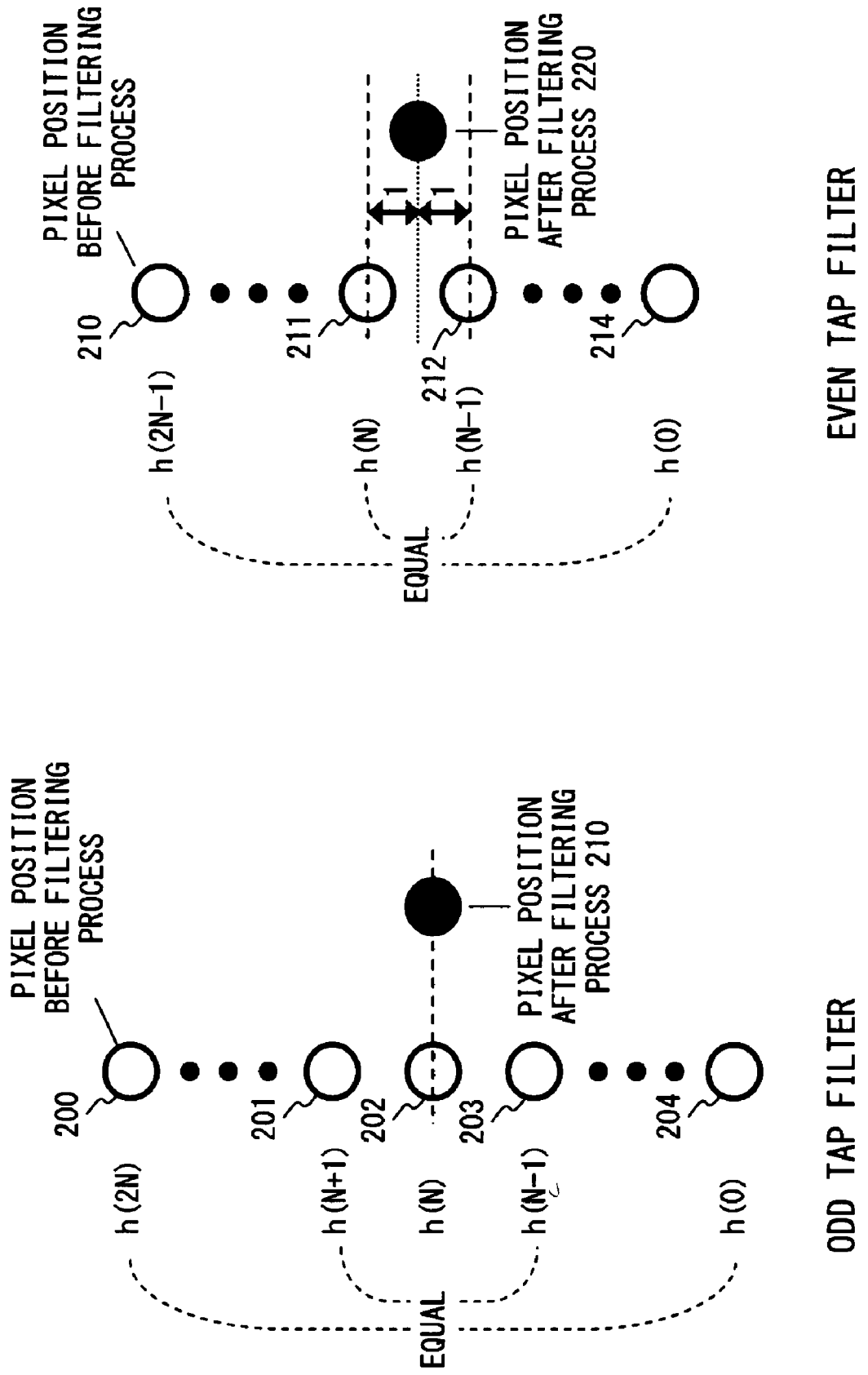
FIGS. 2A and 2B illustrate the pixel positions before/after filtering process of an odd tap filter and an even tap filter.

As earlier described, by specifying either one of the low-frequency decomposition filter A(Z) or high-frequency composition filter Q(Z) illustrated in FIG. 1 and either one of the low-frequency composition filter P(Z) or high-frequency decomposition filter B(Z), a perfect reconstruction filter bank can be realized.

This preferred embodiment uses the filters which meet the above-described Conditions 1 and 2, and the filter coefficients of the low-frequency decomposition filters 610 and 611 in the top and bottom fields are vertically inverted each other and the filter coefficients of the high-frequency decomposition filters 620 and 621 in the top and bottom fields are vertically inverted each other. Furthermore, by using such filters that the filter coefficients of the low-frequency composition filters 630 and 631 in the top and bottom fields of the composition filter 680 are vertically inverted and the filter coefficients of the high-frequency composition filters 640 and 641 in the top and bottom fields are vertically inverted, a perfect reconstruction filter bank with which signals before/after filtering process have the same frequency characteristic can be realized.

The filter selection units 650a, 650b, 650c and 650d of the decomposition filter 670 illustrated in FIG. 6 includes a switch circuit and the like whose connection destination can be switched based upon which the input signal X(Z) 600a is for, the top field or the bottom field.

If the input signal X(Z) is for the top field, the filter selection units 650a through 650d select the upper top-field low-frequency decomposition filter 610 of the two low-frequency decomposition filters and the upper top-field high-frequency decomposition filter 620 of the two high-frequency decomposition filters.

In this case, the input signal X(Z) is supplied to the top-field low-frequency decomposition filter 610 and the top-field high-frequency decomposition filter 620 and the output signals of the filters are outputted to the down-samplers 612 and 622, respectively.

If the input signal X(Z) is for the bottom field, the filter selection units 650a through 650d select the lower bottom-field low-frequency decomposition filter 611 and the lower bottom-field high-frequency decomposition filter 621.

In this case, the input signal X(Z) is supplied to the bottom-field low-frequency decomposition filter 611 and the bottom-field high-frequency decomposition filter 621 and the output signals of the filters are outputted to the down-samplers 612 and 622, respectively.

The top-field low-frequency decomposition filter 610 is a low-frequency pass filter A(Z) which blocks the high-frequency component of the input signal X(Z) 600 and passes the low-frequency component.

The bottom-field low-frequency decomposition filter 611 is a low-frequency pass filter A(1/Z) which has a filter coefficient obtained by vertically inverting the filter coefficient of the top-field low-frequency decomposition filter 610.

The down-sampler 612 samples down the output signal of the top-field low-frequency decomposition filter 610 and the output signal of the bottom-field low-frequency decomposition filter 611 to 2:1 and outputs them as low-frequency signals L(Z) 604. The low-frequency signal 604 after down-sampling becomes a pixel value in a position obtained by internally dividing the pixel position of the original video signal in the ratio of almost 1:3.

The down-sampler 622 samples down the output signal of the top-field high-frequency decomposition filter 620 and the output signal of the bottom-field high-frequency decomposition filter 621 to 2:1 and outputs them as high-frequency signals H(Z) 605.

For example, the above-described top-field low-frequency decomposition filter 610 and the down-sampler 612 correspond to the first low-frequency signal generation unit. The top-field high-frequency decomposition filter 620 and the down-sampler 622 correspond to the first high-frequency signal generation unit. The bottom-field low-frequency decomposition filter 611 and the down-sampler 612 correspond to the second low-frequency signal generation unit. The bottom-field high-frequency decomposition filter 621 and the down-sampler 622 correspond to the second high-frequency signal generation unit.

Next, the operation of the decomposition filter 670 illustrated in FIG. 6 is explained. For example, when a high-definition interlace video signal is given as the input signal X(Z) 600, it is determined by a control unit, which is not illustrated in FIG. 6, based on which the input signal X(Z) 600 is for, the top field or the bottom field and the filter selection units 650a through 650d are switched.

If the input signal X(Z) 600 is for the top field, the top-field low-frequency decomposition filter 610 and the top-field high-frequency decomposition filter 620 are selected and low-frequency filtering and high-frequency filtering are applied to the input signal X(Z) 600 in the vertical direction. Then, their number of pixels is sampled down to 2:1 by the down-samplers 612 and 622 and a low-frequency signal L(Z) 604 and a high-frequency signal H(Z) 605 are generated.

If the input signal X(Z) 600 is for the bottom field, the bottom-field low-frequency decomposition filter 611 and the bottom-field high-frequency decomposition filter 621 are selected and low-frequency filtering and high-frequency filtering are applied to the input signal X(Z) 600 in the vertical direction. Then, their number of pixels is sampled down to 2:1 by the down-samplers 612 and 622 and a low-frequency signal L(Z) 604 and a high-frequency signal H(Z) 605 are generated.

Since the decomposition filter 670 is designed in such a way as to meet the perfect reconstruction filter bank conditions (Conditions 1 and 2) of the composition filter 680, a sub band signal which can be restructured by the composition filter 680 can be generated. Furthermore, since the top-field low-frequency decomposition filter 610 generates a pixel in a position obtained by internally dividing each pixel in the ratio 1:3, the condition of the pixel position in a standard format (for example, 4:2:0 format) can be met.

By using a filter coefficient obtained by vertically inverting the filter coefficient of the top-field low-frequency decomposition filter 610 as the filter coefficient of the bottom-field low-frequency decomposition filter 611 and further using a filter coefficient obtained by vertically inverting the filter coefficient of the top-field high-frequency decomposition filter 620 as the filter coefficient of the bottom-field high-frequency decomposition filter 621, the frequency characteristics of signals in the top and bottom fields can be made equal.

Next, the configuration of the composition filter 680 illustrated in FIG. 6 is explained. To this composition filter 680, for example, the input signal X(Z) 600 sub band-divided by the above-described decomposition filter 670 is inputted.

The up-samplers 613 and 623 insert zero into the input signal X(Z) 600 and samples up it to 1:2. To the up-sampler 613, the low-frequency signal 604 is inputted. This low-frequency signal 604 includes a first low-frequency signal to which a filtering process is applied by the top-field low-frequency decomposition filter 610 and which is sampled down to 2:1 and a second low-frequency signal to which a filtering process is applied by the bottom-field low-frequency decomposition filter 611 and which is sampled down to 2:1.

To the up-sampler 623, the high-frequency signal 605 is inputted. This high-frequency signal 605 includes a first high-frequency signal to which a filter process is applied by the top-field high-frequency decomposition filter 620 and which is sampled down to 2:1 and a second high-frequency signal to which a filter process is applied by the bottom-field high-frequency decomposition filter 621 and which is sampled down to 2:1.

Each of the filter selection units 650*e*, 650*f*, 650*g* and 650*h* includes a switch circuit and the like whose connection destination can be switched based on which the input signal X(Z) 600 is for, the top field or the bottom field.

If the input signal X(Z) 600 is for the top field, the filter selection units 650*e* through 650*h* selects the upper top-field low-frequency composition filter 630 of the two low-frequency composition filters and the upper top-field high-frequency composition filter 640 of the two high-frequency composition filters.

If the input signal X(Z) 600 is for the bottom field, the filter selection units 650*e* through 650*h* selects the lower bottom-field low-frequency composition filter 631 of the two low-frequency composition filters and the lower bottom-field high-frequency composition filter 641 of the two high-frequency composition filters.

The top-field low-frequency composition filter 630 is a low-frequency pass filter P(Z) which passes the low-frequency component of the input signal X(Z) 600.

The bottom-field low-frequency composition filter 631 is a low-frequency pass filter P(1/Z) which has a filter coefficient obtained by vertically inverting the filter coefficient of the top-field low-frequency composition filter 630.

The top-field high-frequency composition filter 640 is a high-frequency pass filter Q(Z) which blocks the low-frequency component of the input signal X(Z) 600 and passes the high-frequency component.

The bottom-field high-frequency composition filter 621 is a high-frequency pass filter Q(1/Z) which has a filter coefficient obtained by vertically inverting the filter coefficient of the top-field low-frequency composition filter 630.

The adder 660 adds the output signal of the low-frequency composition filter (P(Z) or P(1/Z)) selected by the selection units 650*g* and 650*h* and the output signal of a high-frequency composition filter (Q(Z) or Q(1/Z)) and outputs the added signal as a composition signal Y(Z) 601.

Next, the operation of the composition filter 680 is briefly explained. The up-samplers 613 and 623 inserts zero (0) to the input signal X(Z) 600 (sub band-divided signal) and samples up it to 1:2.

If the input signal X(Z) is of the top field, the filter selection units 650*e* through 650*h* selects the top-field low-frequency composition filter 630 and the top-field high-frequency composition filter 640. As a result, the filtering process of the low-frequency composition filter P(Z) and the filtering process of the high-frequency composition filter Q(Z) are applied to the sampled-up signal and the signals after the filtering process are added by the adder 660 and the top-field composition signal 601 is restructured.

If the input signal X(Z) is for the bottom field, the filter selection units 650*e* through 650*h* selects the bottom-field low-frequency composition filter 631 and the bottom-field high-frequency composition filter 641. As a result, the filtering process of the low-frequency composition filter P(1/Z) and the filtering process of the high-frequency composition filter Q(1/Z) are applied to the sampled-up signal and the signals after the filtering process are added by the adder 660 and the bottom-field composition signal 601 is restructured.

Since the composition filter 680 is designed in such a way as to meet the complete restructuring conditions (Conditions 1 and 2) of the decomposition filter 670, the same signal as the original video signal can be generated from the sub band-divided signal.

By using a filter coefficient obtained by vertically inverting the filter coefficient of the top-field low-frequency composition filter 630 as the filter coefficient of the bottom-field low-frequency composition filter 631 and further using a filter coefficient obtained by vertically inverting the filter coefficient of the top-field high-frequency composition filter 640 as the filter coefficient of the bottom-field high-frequency composition filter 641, the frequency characteristics of the top-field and bottom-field signals can be made equal.

Although in the example illustrated in FIG. 6, the filter selection units 650*a* through 650*h* are provided for the input and output of the top-field low-frequency decomposition filter 610 and the bottom-field low-frequency decomposition filter 611, the input and output of the top-field high-frequency decomposition filter 620 and the bottom-field high-frequency decomposition filter 621 and the input and output of each filter of the composition filter 680, a filter selection unit can be also provided only on either the input or output side.

The vertically inverted filter coefficients of the one filter can be also switched by a switch circuit or the like, instead of switching between two filters. In this case, since a common delayer (or including a multiplier) can be used, the structure of a filter can be simplified.

Furthermore, the video signal processing device is not always provided with both the decomposition filter 670 and the composition filter 680. For example, if only a function to sub band-encode a video signal is necessary, it is sufficient for the video signal processing device to have only the decomposition filter 670. If only a function to decode a sub band-divided signal is necessary, it is sufficient for the video signal processing device to have only the composition filter 680.

The above-described decomposition filter 670 and composition filter 680 can be configured by hardware. Alternatively, it can be realized by software using an operational processor or the like.

Next, FIG. 7 explains the pixel positions before/after down-sampling in the sub-band conversion of the preferred embodiment.

As to the signal after filtering process of the decomposition filter 670 illustrated in FIG. 6, pixels 701*a* and 701*b* after down-sampling are generated at points obtained by internally dividing each of the original resolution pixels 700*a* and 700*b*, and 700*c* and 700*d*, respectively, in the ratio 1:3 in the top field.

In the bottom field, pixels 703*a* and 703*b* after down-sampling are generated at points obtained by internally dividing each of the original resolution pixels 702*a* and 702*b*, and 702*c* and 702*d*, respectively, in the ratio 3:1.

As a result, the bottom-field pixel 703*a* after down-sampling is generated in a position obtained by internally dividing the top-field pixels 701*a* and 701*b* after down-sampling into 1:1. Therefore, a low-frequency signal sub band-divided by the decomposition filter 670 meets the conditions of an interlace standard format.

Furthermore, since as filters used for top- and bottom-field pixels, ones whose filter coefficients are vertically inverted each other are used, the frequency characteristics of amplitude after filtering process in the top- and bottom-fields can be completely made equal and a more natural low-frequency signal can be generated.

Figure 8:
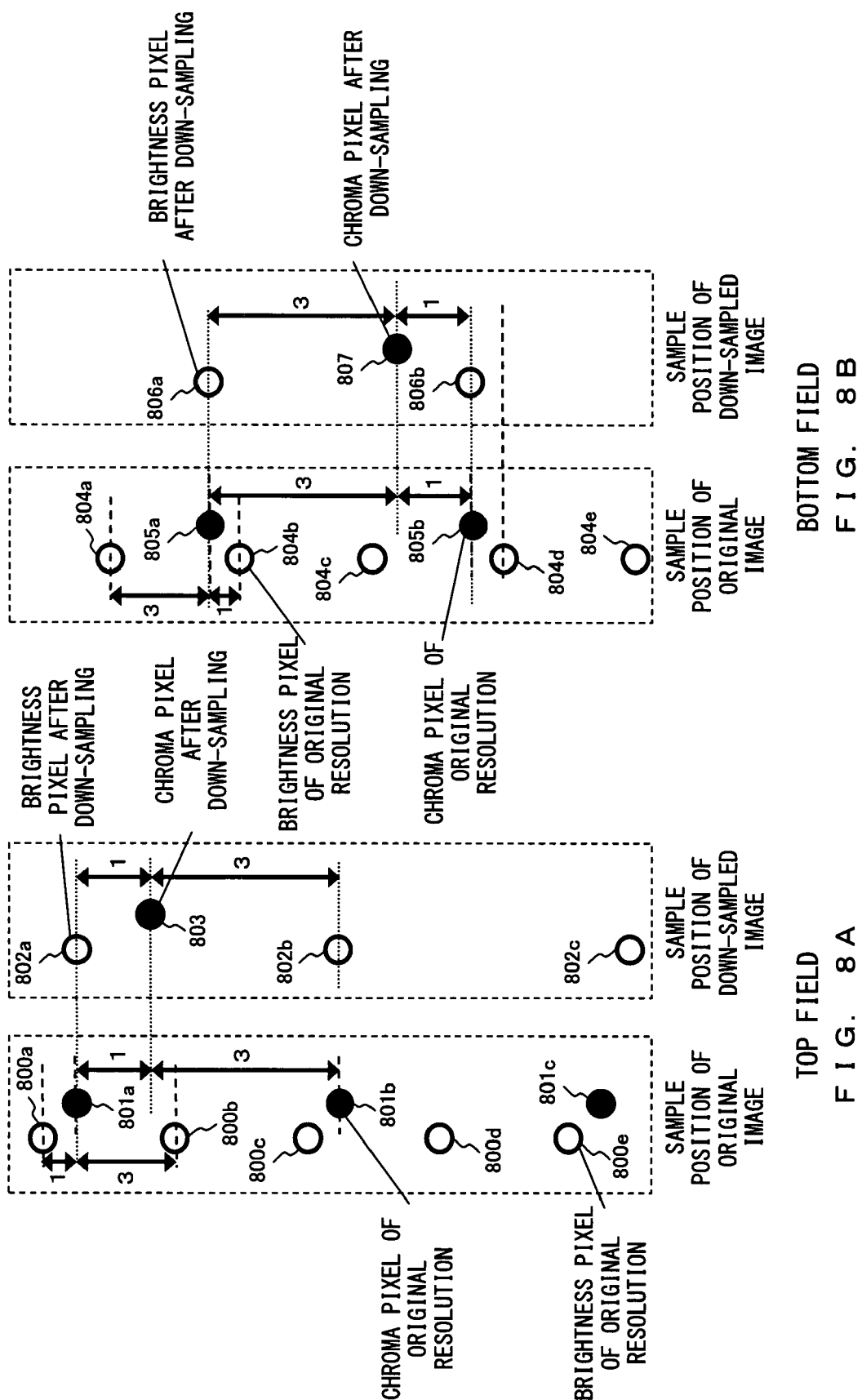
FIGS. 8A and 8B illustrate the positions of brightness and chroma pixels at the time of down-sampling in a 4:2:0 format.

FIGS. 8A and 8B illustrate the positional relationship in the vertical direction between brightness and chroma pixels at the time of down-sampling in a 4:2:0 format.

In the top field illustrated in FIG. 8A, brightness pixels 802*a* and 802*b* after down-sampling are generated at points obtained by internally dividing each of brightness pixels 800*a* and 800*b* and brightness pixels 800*c* and 800*d* of the original resolution, respectively, in the ratio 1:3 downward.

Similarly, a chroma pixel 803 after down-sampling is generated in a position obtained by internally dividing the chroma pixel 801*a* and 801*b* of the original resolution in the ratio 1:3 downward.

In the bottom field illustrated in FIG. 8B, brightness pixels 806*a* and 806*b* after down-sampling are generated at points obtained by internally dividing each of brightness pixels 804*a* and 804*b* and brightness pixels 800*c* and 800*d* of the original resolution, respectively, in the ratio 3:1 downward.

Similarly, a chroma pixel 807 after down-sampling is generated in a position obtained by internally dividing the chroma pixel 805*a* and 805*b* of the original resolution in the ratio 3:1 downward.

Figure 3:
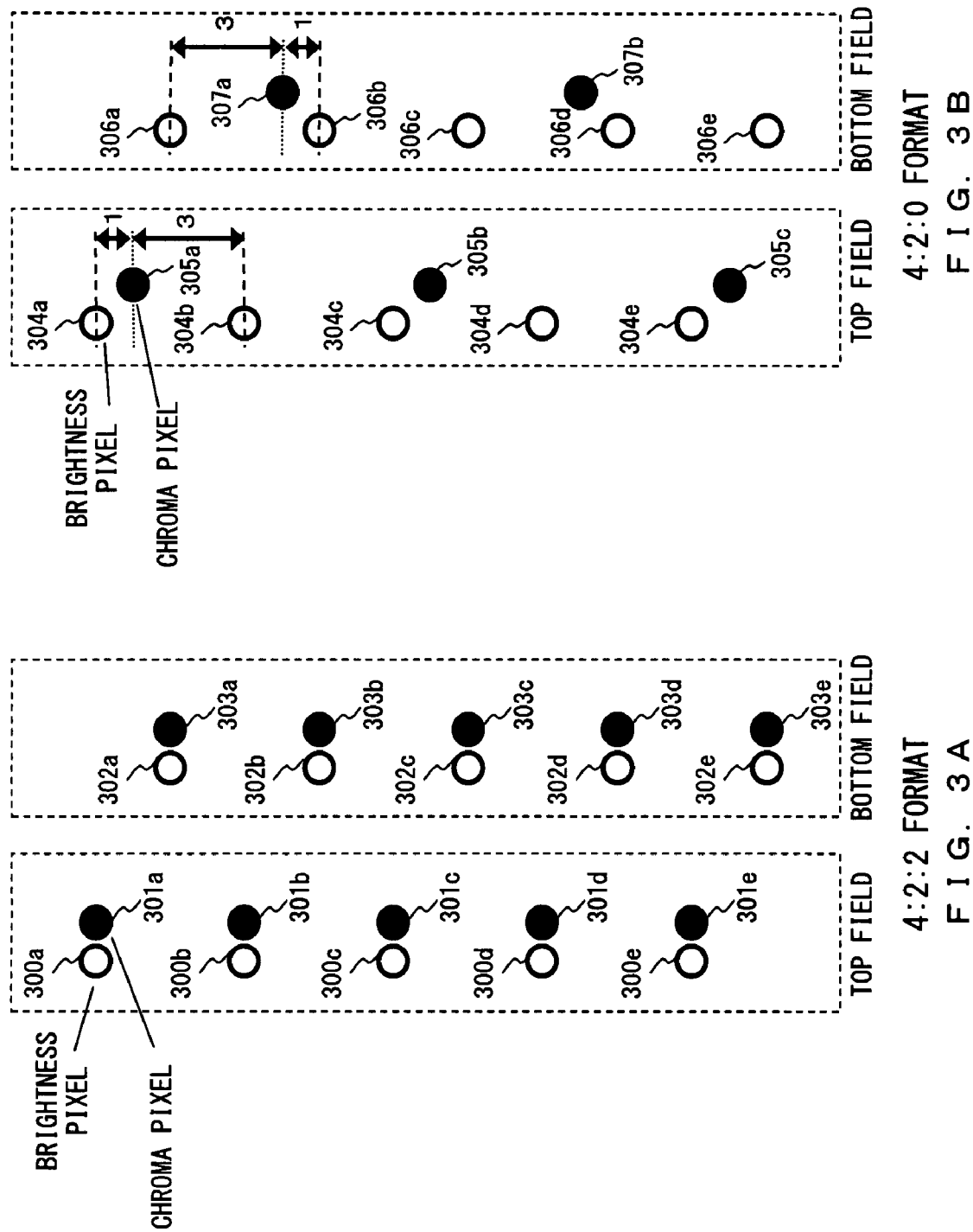
FIGS. 3A and 3B illustrate the pixel positions of a 4:2:2 format and a 4:2:0 format.
Figure 4:
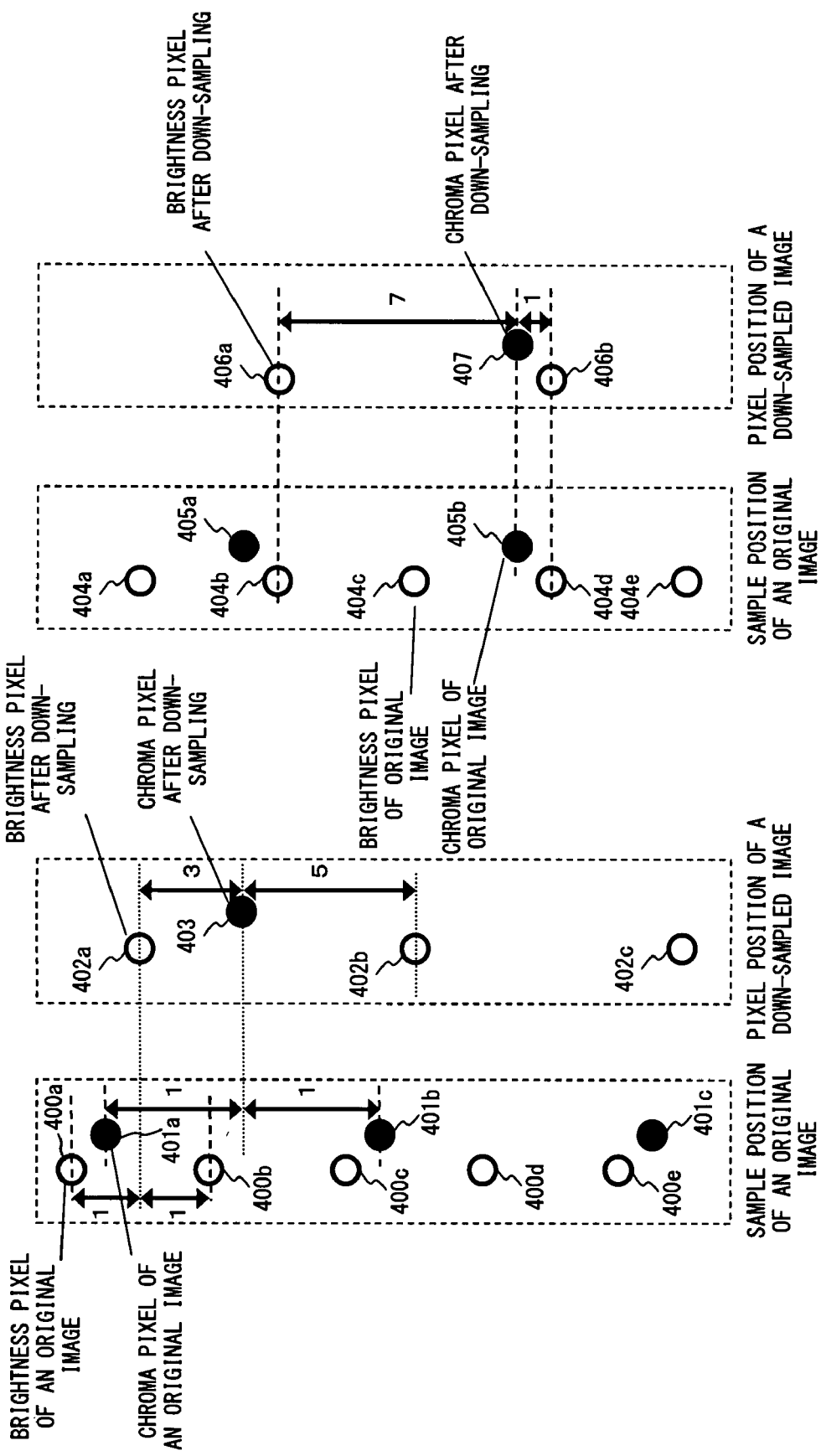
FIGS. 4A and 4B explain the position deviation of a pixel at the time of down-sampling of a 4:2:0 format in the conventional method.

It is clear from FIGS. 8A and 8B that the top and bottom fields after down-sampling satisfy the positional relationship among respective pixels in the 4:2:0 format illustrated in FIG. 3B.

Specifically, in the top field, the chroma pixel 803 after down-sampling is disposed at a point obtained by internally dividing the brightness pixels 802*a* and 802*b* after down-sampling in the ratio 1:3. Similarly, in the bottom field, the chroma pixel 807 is disposed at a point obtained by internally dividing the brightness pixels 802*a* and 802*b* after down-sampling in the ratio 3:1.

Although in the above explanation, the case where the pixel of a sub band-divided low-frequency signal is generated in a position obtained by internally dividing the top and bottom fields into 1:3 and 3:1, respectively, is explained, it can be also sampled down in another position.

According to the above-described first preferred embodiment, since the configuration of the preferred embodiment satisfies two Conditions, that is, filters meet the first Condition of the perfect reconstruction filter bank and Condition 2 of a low-frequency decomposition filter calculating a pixel value in a position obtained by internally dividing each pixel in the ratio of almost 1:3, the positional deviation between the brightness and chroma pixels of an interlace image can be prevented from occurring. Thus, it can meet the disposition condition of a pixel in a standard format, such as 4:2:2, 4:2:0 and the like. Furthermore, by using filters whose coefficients are vertically inverted each other for the top and bottom fields, the frequency characteristics of a signal in the top and bottom fields can be made equal.

Figure 9:
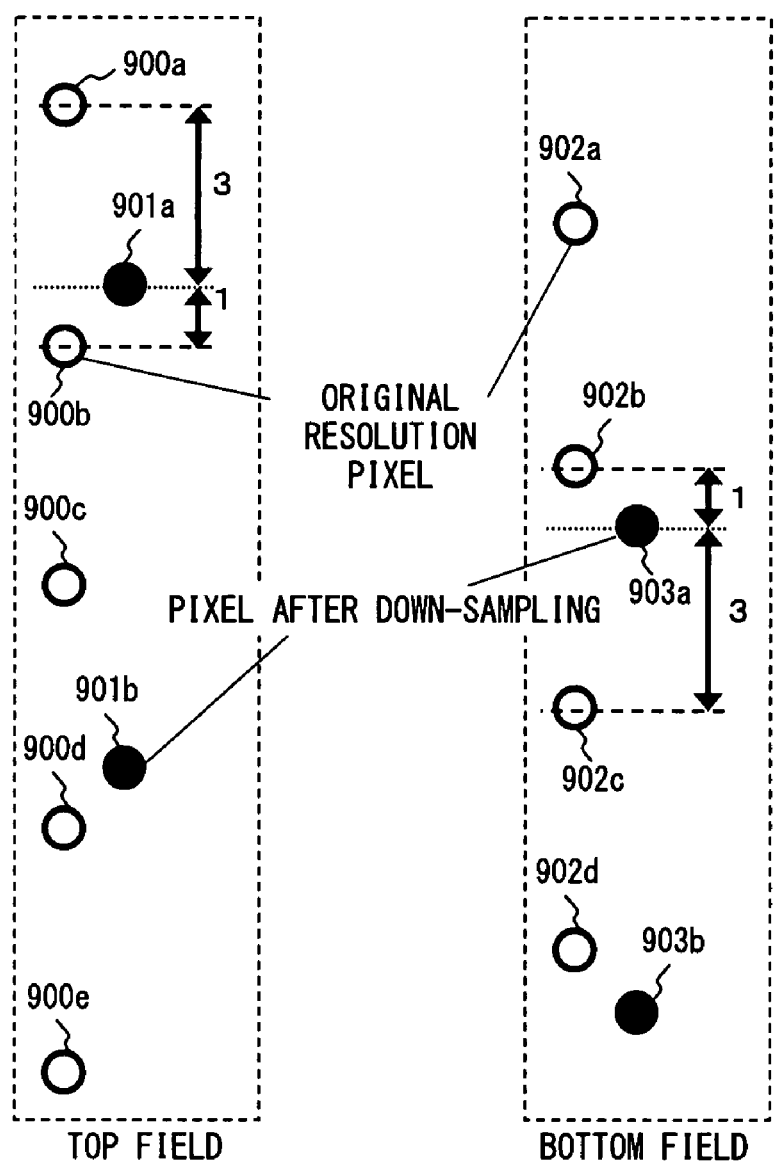
FIG. 9 illustrates the disposition of a pixel at the time of down-sampling in the second preferred embodiment.

FIG. 9 illustrates the disposition of a pixel at the time of down-sampling in the second preferred embodiment.

In this second preferred embodiment, the top-/bottom-field filter selection units 650*a* through 650*h* illustrated in FIG. 6 are reversely operated. More specifically, in FIG. 6, when the input signal X(Z) 600 is for the top field, a low-frequency decomposition filter A(1/Z) and a high-frequency decomposition filter B(1/Z) are selected and filtering process is performed.

In such a configuration, as illustrated in FIG. 9, a pixel 901*a* after down-sampling is disposed at a point obtained by internally dividing top field pixels 900*a* and 900*b* in the ratio 1:3.

FIG. 10 explains the case where sub-band encoding is applied to only the chroma signal 1000 of an image in a 4:2:2 format using the decomposition filter 670 illustrated in FIG. 6.

This is an example of sub band encoding in which the chroma signal 1000 is separated into a chroma low-frequency signal 1004 and a chroma high-frequency signal 1005 by a chroma decomposition filter 1070, and both brightness signal 1010 and the chroma low-frequency signal 1004 sampled down to 2:1 together are handled as a 4:2:0 formatted image 1060.

The chroma decomposition filter 1070 is a filter for sub band-dividing an input signal into a low-frequency signal and a high-frequency signal like the decomposition filter illustrated in FIG. 6.

FIGS. 11A and 11B explain sub-band conversion from a 4:2:2 format to a 4:2:0 format. FIG. 11A illustrates the pixel position after down-sampling in the case where sub band conversion is performed by the conventional method. FIG. 11B illustrates the pixel position after down-sampling in the case where sub band conversion is performed using the decomposition filter 670 in the preferred embodiment.

As illustrated in FIG. 11A, according to the conventional method, chroma pixels 1101*a* and 1101*b* after down-sampling are disposed at points obtained by internally dividing top-field brightness pixels 1100*a* and 1100*b*, and top-field brightness pixels 1100*c* and 1100*d* into 1:1.

Bottom-field chroma pixels 1103*a* and 1103*b* are disposed in the same positions as bottom-field brightness pixels 1102*b* and 1102*d* and each of them deviates from that in the essential 4:2:0 format, illustrated in FIG. 3B, by ¼ pixel pitch.

However, if sub band conversion is performed using the decomposition filter 670 in the preferred embodiment, as illustrated in FIG. 11B, top-field chroma pixels 1105*a*, 1105*b* and 1105*c* after down-sampling are generated at points obtained by internally dividing brightness pixels 1104*a* and 1104*b* and brightness pixels 1104*c* and 1104*d*, respectively, in the ratio 1:3.

Bottom-field chroma pixels 1107*a* and 1107*b* after down-sampling are generated at points obtained by internally dividing brightness pixels 1106*a* and 1106*b* and brightness pixels 1106*c* and 1106*d*, respectively, in the ratio 3:1. The pixel disposition illustrated in FIG. 11B coincides with the pixel disposition of the essential 4:2:0 format illustrated in FIG. 3B.

We have designed one example of the above-described decomposition filter 670 and composition filter 680 in the first preferred embodiment. Their filter coefficients are illustrated below.

The top-field low-frequency decomposition filter (A(Z)) 610 can be expressed as follow, using Z transform.

$$A(Z) = \Sigma a(k) \cdot Z^{-k}$$

When the range of k is restricted to −3 through 4 assuming that the number of taps 8, the preferable value of a filter a (k) becomes as follows. The calculated values are rounded off to eight decimal places.

$$a(4) = -0.00390625$$

$$a(3) = -0.0234375$$

$$a(2) = -0.01171875$$

$$a(1) = 0.37890625$$

$$a(0) = 0.56640625$$

$$a(-1) = 0.1484375$$

$$a(-2) = -0.05078125$$

$$a(-3) = -0.00390625 \qquad \text{(Equation 8)}$$

The top-field low-frequency composition filter (P(Z)) 630 can be expressed as follow, using Z transform.

$$P(Z) = \Sigma p(k) \cdot Z^{-k}$$

When the range of k is restricted to −3 through 4 assuming that the number of taps 8, the preferable value of a filter p(k) becomes as follows.

$$p(4) = 0.02663601$$

$$p(3) = -0.159816059$$

$$p(2) = 0.307085723$$

$$p(1) = 1.220626784$$

$$p(0) = 0.670906907$$

$$p(-1) = -0.061166775$$

$$p(-2) = -0.004628639$$

$$p(-3) = 0.000356049 \qquad \text{(Equation 9)}$$

The top-field high-frequency decomposition filter (B(Z)) 620 and the top-field high-frequency composition filter (Q(Z)) 640 can be expressed as follows, using a constant C as described above.

$$B(Z) = C \cdot P(-Z)$$

$$Q(Z) = -(1/C) \cdot A(-Z)$$

Assuming that C=½, the preferable value of the filter coefficient of 8-tap high-frequency decomposition filter B(Z) becomes as follows when the value of k is −3 through 4.

$$b(4) = 0.000178025$$

$$b(3) = 0.00231432$$

$$b(2) = -0.030583388$$

$$b(1) = -0.335453454$$

$$b(0) = 0.610313392$$

$$b(-1) = -0.153542862$$

$$b(-2) = -0.07990803$$

$$b(-3) = -0.013318005 \qquad \text{(Equation 10)}$$

Furthermore, when the value of k is −3 through 4, the preferable value of the filter coefficient of a 8-tap high-frequency composition filter Q(Z) becomes as follows.

$$q(4) = -0.0078125$$

$$q(3) = 0.1015625$$

$$q(2) = 0.296875$$

$$q(1) = -1.1328125$$

$$q(0) = 0.7578125$$

$$q(-1) = 0.0234375$$

$$q(-2) = -0.046875$$

$$q(-3) = 0.0078125 \qquad \text{(Equation 11)}$$

The above-described filters A(Z), B(Z), P(Z) and Q(Z) meet the perfect reconstruction filter bank conditions and a pixel to which filtering process is applied by the low-frequency decomposition filter A(Z) and which is sampled down is disposed in a position obtained by internally dividing between two pixels multiplied by the coefficients of k=1 and k=0 in the ratio 0.9375:3.0625, that is, almost 1:3.

Generally, a group delay characteristic is used to express how much a pixel value represented by a pixel after filtering process is deviated from the original pixel.

The frequency characteristic of a filter F can be expressed as follows.

$$F(\omega) = Fre(\omega) + j \cdot Fim(\omega) \qquad \text{(Expression 12)}$$

In the above-described expression, F(ω) is the frequency characteristic of a filter of frequency ω and can be obtained by assigning $z = e^{j\omega}$ to the z of the filter expressed by z transform, that is, the polynomial of z.

In the above-described expression, j is an imaginary unit. Fre(ω) and Fim(ω) represents the real number and imaginary parts, respectively, of F(ω). In this case, the group delay characteristic GDC(ω) at the frequency ω of the filter F(ω) can be expressed as follows.

$$GDC(\omega) = d(\tan^{-1}(Fim(\omega)/Fre(\omega)))/d\omega \qquad \text{(Expression 13)}$$

Then, this group delay characteristic indicates by how many pixels the component of the frequency ω after applying filtering is shifted.

Specifically, if GDC(ω) is a value α, the component of the frequency ω is shifted by α pixels from the current signal after filtering process. Since a low-frequency component is especially important in an image, in this group delay characteristic too, a low-frequency, more particularly a value in the vicinity of ω=0 is important. The group delay of the filter A(Z) in the case of ω=0 is 0.23375. Thus, it is led that the pixel is disposed at a point obtained by internally dividing between two pixels multiplied by the coefficients of k=1 and k=0 in the ratio 0.9375:3.0625.

Next, the bottom-field low-frequency decomposition filter 611 having a filter coefficient obtained by vertically inverting the filter coefficient of a low-frequency decomposition filter A(Z) can be expressed as follows, using Z transform.

$$A(1/Z) = \Sigma a'(k) \cdot Z^{-k}$$

The filter coefficient a'(k) becomes as follows on the basis of the filter coefficient a(k) of the low-frequency decomposition filter A(Z) in Expression 8.

$a'(3) = a(-3) = -0.00390625$ $a'(2) = a(-2) = -0.05078125$ $a'(1) = a(-1) = 0.1484375$ $a'(0) = a(0) = 0.56640625$ $a'(-1) = a(1) = 0.37890625$ $a'(-2) = a(2) = -0.01171875$ $a'(-3) = a(3) = -0.0234375$ $a'(-4) = a(4) = -0.00390625$ (Expression 14)

Similarly, the coefficient b'(k) of the bottom-field high-frequency decomposition filter (B(1/Z)) 621 can be expressed as follows by vertically inverting the coefficient b(k) of the high-frequency decomposition filter B(Z) in Expression 10.

$b'(3) = b(-3)$, $b'(2) = b(-2)$, $b'(1) = b(-1)$, $b'(0) = b(0)$, $b'(-1) = b(1)$, $b'(-2) = b(2)$, $b'(-3) = b(3)$ and $b'(-4) = b(4)$ Similarly, the coefficient p'(k) of the bottom-field low-frequency composition filter (P(1/Z)) 631 can be expressed as follows by vertically inverting the coefficient p(k) of the low-frequency composition filter P(Z) in Expression 9.

Similarly, the coefficient q'(k) of the bottom-field high-frequency composition filter (Q(1/Z)) 641 can be expressed as follows by vertically inverting the coefficient q(k) of the high-frequency composition filter Q(Z) in Expression 11.

The above-described coefficients are one example and besides, there are many filters meeting the earlier-described Conditions 1 and 2. The number of taps is not limited to eight. When mounting it on a device, a coefficient which is rounded off to the desired number of valid digits in a range in which an error at the time of re-structuring can be allowed by the constraint of a hardware scale can be used.

Examples of operations using rounded coefficient are illustrated below. The further preferred embodiments of filters A(Z) and P(Z) meeting Conditions 1 and 2 are as follows.

$a(4) = 0.000100124$ $a(3) = -0.008424721$ $a(2) = -0.02266892$ $a(1) = 0.383323192$ $a(0) = 0.549387953$ $a(-1) = 0.133775112$ $a(-2) = -0.026819158$ $a(-3) = -0.008673583$ (Equation 15)

$p(4) = -0.001215483$ $p(3) = -0.102274249$ $p(2) = 0.233191111$ $p(1) = 1.119074193$ $p(0) = 0.90949634$ $p(-1) = -0.062553387$ $p(-2) = -0.141471967$ $p(-3) = 0.045753444$ (Equation 16)

These coefficients are rounded off to the accuracy of ten bits of the factional portion by a binary number as follows.

$a(4) = 0/1024$ $a(3) = -9/1024$ $a(2) = -23/1024$ $a(1) = 393/1024$ $a(0) = 563/1024$ $a(-1) = 137/1024$ $a(-2) = -27/1024$ $a(-3) = -9/1024$ (Equation 18)

$p(4) = -1/1024$ $p(3) = -105/1024$ $p(2) = 239/1024$ $p(1) = 1146/1024$ $p(0) = 931/1024$ $p(-1) = -64/1024$ $p(-2) = -145/1024$ $p(-3) = 47/1024$ (Equation 19)

A filtering process can be realized by multiplying the integer portion of the denominator of each filter coefficient of the above-described A(Z) and P(Z) by a pixel value to which filtering is applied, accumulating the multiplied values and after adding 512 to the accumulated value in order to round off it, discarding 10 bits (dividing by 1024) as a preferable operating method.

According to the disclosed video signal processing device, the positions of brightness and chroma pixels at the time of down-sampling can be matched with a standard pixel format. Furthermore, the frequency characteristics of the first low-frequency decomposition filter used for a pixel in the first field, the second low-frequency decomposition filter used for a pixel in the second field can be made almost equal and the frequency characteristics of the first and second high-frequency decomposition filters can be made almost equal.

According to the other disclosed video signal processing device, the positions of brightness and chroma pixels at the time of down-sampling can be matched with a standard pixel format. Furthermore, the frequency characteristics of the first low-frequency decomposition filter used for a pixel in the first field and the second low-frequency decomposition filter used for a pixel in the second field can be made almost equal, and the frequency characteristics of the first high-frequency decomposition filter and the second high-frequency decomposition filter can be made almost equal.

According to the another disclosed video signal processing device, the positions of brightness and chroma pixels at the time of down-sampling can be matched with a standard pixel format. Furthermore, the frequency characteristics of the first low-frequency decomposition filter A(Z) used for a pixel in the first field and the second low-frequency decomposition filter A(1/Z) used for a pixel in the second field can be made almost equal, and the frequency characteristics of the first high-frequency decomposition filter B(Z) and the second high-frequency decomposition filter B(1/Z) can be made almost equal.

According to the another disclosed video signal processing device, the positions of brightness and chroma pixels at the time of down-sampling can be matched with a standard pixel format. Furthermore, the frequency characteristics of the first low-frequency composition filter P(Z) used for a pixel in the first field and the second low-frequency composition filter P(1/Z) used for a pixel in the second filed can be made almost equal, and the frequency characteristics of the first high-frequency composition filter Q(Z) and the second high-frequency composition filter Q(1/Z) can be made almost equal.

In the above-described video signal processing device, the first field of a video signal having an interlace structure composed of the above-described first and second fields is a top field and the second field is a bottom field.

By such a configuration, the frequency characteristics of the top and bottom fields can be almost matched.

According to the disclosed video signal processing device, the positional relationship between brightness and chroma pixels at the time of down-sampling or up-sampling can satisfy a standard pixel format. The frequency characteristics of a filter used for a pixel in the first field and a filter used for a pixel in the second field can be made almost equal.

The present invention is not limited to one dividing a band into two sub bands and it is also applicable to one dividing a band into three or more sub bands. Furthermore, a low-frequency decomposition filter, a high-frequency decomposition filter, a low-frequency composition filter and the like are not limited to the circuits indicated in the preferred embodiments and a filter having another circuit configuration can be also used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A video signal processing system comprising:
an image quality decreasing processing unit that samples down, to 2:1, at least a chroma pixel of a video signal having an interlace structure composed of first and second fields by dividing the chroma pixel into low-frequency and high-frequency areas in a vertical direction; and
an image quality increasing processing unit that samples up and composes divided signals whose image qualities have been decreased by the image quality decreasing processing unit and which have been divided into the low-frequency and high-frequency areas in the vertical direction,
wherein the image quality decreasing processing unit comprises:
a first low-frequency signal processing unit for applying filtering with a first low-frequency decomposition filter to a chroma pixel in a first field of the video signal in the vertical direction and generating a first low-frequency signal sampled down to 2:1;
a first high-frequency signal processing unit for applying filtering with a first high-frequency decomposition filter to the chroma pixel in the first field of the video signal in the vertical direction and generating a first high-frequency signal sampled down to 2:1;
a second low-frequency signal processing unit for applying filtering with a second low-frequency decomposition filter to a chroma pixel in the second field of the video signal in the vertical direction and generating a second low-frequency signal sampled down to 2:1; and
a second high-frequency signal processing unit for applying filtering with a second high-frequency decomposition filter to a chroma pixel in the second field of the video signal in the vertical direction and generating a second high-frequency signal sampled down to 2:1, wherein
the image quality increasing processing unit comprises:
a third low-frequency signal processing unit for generating a signal obtained by sampling up the first low-frequency signal to 1:2 in the vertical direction using a first low-frequency composition filter;
a third high-frequency signal processing unit for generating a signal obtained by sampling up the first high-frequency signal to 1:2 in the vertical direction using a first high-frequency composition filter;
a fourth low-frequency signal processing unit for generating a signal obtained by sampling up the second low-frequency signal to 1:2 in the vertical direction using a second low-frequency composition filter;
a fourth high-frequency signal processing unit for generating a signal obtained by sampling up the second high-frequency signal to 1:2 in the vertical direction using a second high-frequency composition filter; and
a first composition unit for generating the first field by adding the signals generated by the third low-frequency signal processing unit and the third high-frequency signal processing unit or by adding the signals generated by the fourth low-frequency signal processing unit and the fourth high-frequency signal processing unit, wherein
the first low-frequency decomposition filter and the first low-frequency composition filter satisfy perfect reconstruction conditions, the first high-frequency decomposition filter and the first high-frequency composition filter satisfy perfect reconstruction conditions, the second low-frequency decomposition filter and the second low-frequency composition filter satisfy perfect reconstruction conditions, and the second high-frequency decomposition filter and the second high-frequency composition filter satisfy perfect reconstruction conditions, a filter property of the first low-frequency decomposition filter is vertical inversion of a filter property of the second low-frequency decomposition filter, a filter property of the first low-frequency composition filter is vertical inversion of the second low-frequency composition filter, a filter property of the first high-frequency decomposition filter is vertical inversion of a filter property of the second high-frequency decomposition filter, and a filter property of the first high-frequency composition filter is vertical inversion of a filter property of the second high-frequency composition filter, and the first low-frequency decomposition filter calculates a pixel value in a position obtained by internally dividing each chroma pixel in the ratio of 1:3 with respect to a brightness pixel.

2. The video signal processing system according to claim 1 wherein the chroma pixel in the first field after down sampling is positioned in the ratio of 1:3 or 3:1 with respect to a brightness pixel in the first field after the down sampling, and the chroma pixel in the second field after the down sampling is positioned in the ratio of 1:3 or 3:1 with respect to the brightness pixel in the second field after the down sampling.

3. A video signal processing device wherein first and second low-frequency signals sampled down to 2:1 by applying filtering with first and second low-frequency decomposition filters in a vertical direction to a chroma pixel in first and second fields of a video signal having an interlace structure and subject to resolution reduction, and first and second high-frequency signals sampled down to 2:1 by applying filtering with first and second high-frequency decomposition filters in the vertical direction to the chroma pixel in the first and second fields are received, wherein the video signal processing device comprises:

a third low-frequency signal processing unit for generating a signal obtained by sampling up the first low-frequency signal to 1:2 in the vertical direction using a first low-frequency composition filter;

a third high-frequency signal processing unit for generating a signal obtained by sampling up the first high-frequency signal to 1:2 in the vertical direction using a first high-frequency composition filter;

a fourth low-frequency signal processing unit for generating a signal obtained by sampling up the second low-frequency signal to 1:2 in the vertical direction using a second low-frequency composition filter;

a fourth high-frequency signal processing unit for generating a signal obtained by sampling up the second high-frequency signal to 1:2 in the vertical direction using a second high-frequency composition filter; and a first composition unit for generating the first field by adding the signals generated by the third low-frequency signal processing unit and the third high-frequency signal processing unit or by adding the signals generated by the fourth low-frequency signal processing unit and the fourth high-frequency signal processing unit, wherein the first low-frequency decomposition filter and the first low-frequency composition filter satisfy perfect reconstruction conditions, the first high-frequency decomposition filter and the first high-frequency composition filter satisfy perfect reconstruction conditions, the second low-frequency decomposition filter and the second low-frequency composition filter satisfy perfect reconstruction conditions, and the second high-frequency decomposition filter and the second high-frequency composition filter satisfy perfect reconstruction conditions, a filter property of the first low-frequency decomposition filter is vertical inversion of a filter property of the second low-frequency decomposition filter, a filter property of the first low-frequency composition filter is vertical inversion of the second low-frequency composition filter, a filter property of the first high-frequency decomposition filter is vertical inversion of a filter property of the second high-frequency decomposition filter, and a filter property of the first high-frequency composition filter is vertical inversion of a filter property of the second high-frequency composition filter, and the first low-frequency decomposition filter calculates a pixel value in a position obtained by internally dividing each chroma pixel in the ratio of 1:3 with respect to a brightness pixel.

4. A video signal processing method performed by an image processing system comprising:

an image quality decreasing processing unit that samples down, to 2:1, at least a chroma pixel of a video signal having an interlace structure composed of first and second fields by dividing the chroma pixel into low-frequency and high-frequency areas in a vertical direction; and an image quality increasing processing unit that samples up and composes divided signals whose image qualities have been decreased by the image quality decreasing processing unit and which have been divided into the low-frequency and high-frequency areas in the vertical direction, wherein the image quality decreasing processing unit applies filtering with a first low-frequency decomposition filter to a chroma pixel in the first field of the video signal in the vertical direction and generates a first low-frequency signal sampled down to 2:1, applies filtering with a first high-frequency decomposition filter to a chroma pixel in the first field of the video signal in the vertical direction and generates a first high-frequency signal sampled down to 2:1, applies filtering with a second low-frequency decomposition filter to a chroma pixel in the second field of the video signal in the vertical direction and generates a second low-frequency signal sampled down to 2:1, and applies filtering with a second high-frequency decomposition filter to a chroma pixel in the second field of the video signal in the vertical direction and generates a second high-frequency signal sampled down to 2:1, wherein the image quality increasing processing unit generates a signal obtained by sampling up the first low-frequency signal to 1:2 in the vertical direction using a first low-frequency composition filter, generates a signal obtained by sampling up the first high-frequency signal to 1:2 in the vertical direction using a first high-frequency composition filter, generates a signal obtained by sampling up the second low-frequency signal to 1:2 in the vertical direction using a second low-frequency composition filter, generates a signal obtained by sampling up the second high-frequency signal to 1:2 in the vertical direction using a second high-frequency composition filter, generates the first field by adding the signal obtained by sampling up the first low-frequency signal to 1:2 in the vertical direction using the first low-frequency composition filter and the signal obtained by sampling up the first high-frequency signal to 1:2 in the vertical direction using the first high-frequency composition filter or by adding the signal obtained by sampling up the second low-frequency signal to 1:2 in the vertical direction using the second low-frequency composition filter and the signal obtained by sampling up the second high-frequency signal to 1:2 in the vertical direction using the second high-frequency composition filter, wherein the first low-frequency decomposition filter and the first low-frequency composition filter satisfy perfect reconstruction conditions, the first high-frequency decomposition filter and the first high-frequency composition filter satisfy perfect reconstruction conditions, the second low-frequency decomposition filter and the second low-frequency composition filter satisfy perfect reconstruction conditions, and the second high-frequency decomposition filter and the second high-frequency composition filter satisfy perfect reconstruction conditions, a filter property of the first low-frequency decomposition filter is vertical inversion of a filter property of the second low-frequency decomposition filter, a filter property of the first low-frequency composition filter is vertical inversion of the second low-frequency composition filter, a filter property of the first high-frequency decomposition filter is vertical inversion of a filter property of the second high-frequency decomposition filter, and a filter property of the first high-frequency composition filter is vertical inversion of a filter property of the second high-frequency composition filter, and the first low-frequency decomposition filter calculates a pixel value in a position obtained by internally dividing each chroma pixel in the ratio of 1:3 with respect to a brightness pixel.

5. The video signal processing method according to claim 4 wherein the chroma pixel in the first field after down sampling is positioned in the ratio of 1:3 or 3:1 with respect to a brightness pixel in the first field after the down sampling, and the chroma pixel in the second field after the down sampling is positioned in the ratio of 1:3 or 3:1 with respect to the brightness pixel in the second field after the down sampling.

6. A video signal processing method performed by a video signal processing device that receives first and second low-frequency signals sampled down to 2:1 by applying filtering with first and second low-frequency decomposition filters in a vertical direction to a chroma pixel in first and second fields of a video signal having an interlace structure and subject to resolution reduction, and first and second high-frequency signals sampled down to 2:1 by applying filtering with first and second high-frequency decomposition filters in the vertical direction to the chroma pixel in the first and second fields, wherein the video signal processing device generates a signal obtained by sampling up the first low-frequency signal to 1:2 in the vertical direction using a first low-frequency composition filter, generates a signal obtained by sampling up the first high-frequency signal to 1:2 in the vertical direction using a first high-frequency composition filter, generates a signal obtained by sampling up the second low-frequency signal to 1:2 in the vertical direction using a second low-frequency composition filter, generates a signal obtained by sampling up the second high-frequency signal to 1:2 in the vertical direction using a second high-frequency composition filter, and generates the first field by adding the signal obtained by sampling up the first low-frequency signal to 1:2 in the vertical direction using the first low-frequency composition filter and the signal obtained by sampling up the first high-frequency signal to 1:2 in the vertical direction using the first high-frequency composition filter or by adding the signal obtained by sampling up the second low-frequency signal to 1:2 in the vertical direction using the second low-frequency composition filter and the signal obtained by sampling up the second high-frequency signal to 1:2 in the vertical direction using the second high-frequency composition filter, the first low-frequency decomposition filter and the first low-frequency composition filter satisfy perfect reconstruction conditions, the first high-frequency decomposition filter and the first high-frequency composition filter satisfy perfect reconstruction conditions, the second low-frequency decomposition filter and the second low-frequency composition filter satisfy perfect reconstruction conditions, and the second high-frequency decomposition filter and the second high-frequency composition filter satisfy perfect reconstruction conditions, a filter property of the first low-frequency decomposition filter is vertical inversion of a filter property of the second low-frequency decomposition filter, a filter property of the first low-frequency composition filter is vertical inversion of the second low-frequency composition filter, a filter property of the first high-frequency decomposition filter is vertical inversion of a filter property of the second high-frequency decomposition filter, and a filter property of the first high-frequency composition filter is vertical inversion of a filter property of the second high-frequency composition filter, and the first low-frequency decomposition filter calculates a pixel value in a position obtained by internally dividing each chroma pixel in the ratio of 1:3 with respect to a brightness pixel.

* * * * *